Patented Feb. 7, 1950

2,496,850

UNITED STATES PATENT OFFICE 2,496,850

METHOD AND APPARATUS FOR MANUFACTURING CONCRETE PARTS

Raymond Bertrand, Brussels, Belgium, assignor to Compagnie Internationale des Pieux Armes Frankignoul, Societe Anonyme, Liege, Belgium Application October 23, 1946, Serial No. 705,211
In France November 6, 1945

7 Claims. (Cl. 25—118)

Known methods and devices are very suitable to the manufacture of concrete parts and the like, such as posts, kerbstones of pavements, which do not have to be effected with great precision, but they do not enable parts to be produced with a manufacturing tolerance that is comparable to the customary tolerance for metal products. Since it is also impossible to apply machine tools to the sizing of concrete parts, especially by reason of the heterogeneous nature of the said material, the use of concrete parts or the like has hitherto had to be foregone in cases in which the use of parts made of the said material was desirable but practically impossible since the said parts could not be effected with the precision required.

In order to overcome this deficiency, the present invention provides a method of manufacture of concrete parts and the like which comprise at least two elements whereof the relative positions and, as the case may be, the configuration have to be effected with great precision, in which method the parts are moulded according to any method and are removed from the mould or moulds prior to the hardening of the material, the said method being principally characterised by the feature that the part newly removed from the mould is locally subjected to a compression stress so as to modify the shape thereof until the said elements occupy the correct position with respect to one another, the said pressure being maintained until the material constituting the part may have become sufficiently hard.

Thus, it is especially possible to adjust the relative angular positions of certain faces of the part with respect to one another or with respect to a recessed portion of the part, as well as the distance between certain surfaces and a reference system comprised in the part, such as a face or point of the latter part or of a member fixed in the part when moulding the latter.

By reason of being removed from the mould or moulds, the concrete part or the like which is advantageously manufactured by vibration always undergoes a certain subsidence, in spite of the fact that when leaving the mould the concrete already has a density which is sufficient to preserve the general shape of the part. The method according to the invention not only enables the said subsidence to be neutralized by a deformation of opposite indication which is, at least, in the direction that is important to the rectification of the relative positions of the elements whereof the sizing is necessary, but also enables the moulding errors to be corrected in one direction or the other, the said errors being almost inevitable especially when the reference system forms part of a member fixed into the part during the operation of moulding. Even if use were made of very accurate moulds wherein the concrete would remain until hardening, it would not be possible to effect such sizing. The said manner of working would, moreover, require the use of very firm moulds which would be immobilised during the whole setting period of the concrete, thus being incompatible with the conditions imposed upon modern methods in which the parts, manufactured by vibration for example, have to be immediately removed from the mould or moulds, thereby necessarily entailing a certain subsidence of the concrete.

The pressure locally exerted upon the part newly removed from the mould or moulds may be effected by any suitable device. Nevertheless, the present invention provides for a device enabling the rectification of the angular position of one element of the part to be effected with respect to another element in a very simple and rational manner, the said device comprising two members rigidly fixed to each other in the correct angular position which has to be given to the said elements, the said device being provided with means for exerting pressure upon one of the members in order to act upon one of the said elements, whereas the other member is so guided as to coincide with the position of the other of the said elements.

Other features and advantages will appear from the description of two examples of execution, a description which is hereinafter given with reference to the accompanying diagrammatic drawing in which—

Figure 1:
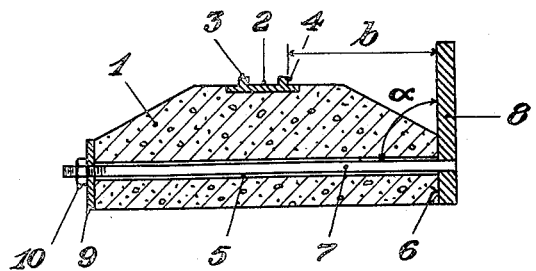
Fig. 1 shows a vertical sectional view of a device according to the invention, applied to a railway sleeper-bracket.

In the example shown in Fig. 1, a concrete bracket for a railway sleeper is denoted by 1. A metal sole-plate 2, which is intended to receive a rail flange between its ribs 3 and 4, is placed on the upper face of the bracket and is secured in the mass of the latter. The bracket has a longitudinally hollowed portion 5 intended to receive a stay-bar serving to assemble both brackets, such as 1, with one or more intermediate parts, the first of which will be applied against the face 6, the whole then being made rigid by putting the stay-bar under tension. Not only is it necessary to effect the correct angular position of the face 6 with respect to the axis of the hollowed portion 5, the angle being 90° for example, but it is also necessary strictly to observe the distance b between the rib 4 and the face 6, since a determined spacing, 1.435 metres for example, with a tolerance of ± 1 millimetre only, must be effected between both rails of the track. In spite of all the precautions taken, the position of the sole-plate 2 in the part 1 inevitably varies due to errors of placing into position in the mould and possible displacements during the operation of moulding. Moreover, the position of the rib 4 on the sole-plate 2 can vary as the manufacturing tolerance of the latter sole-plate.

According to the present invention, the result sought may be effected in the following manner. Immediately after the removal of the concrete part 1 from the mould, a rod 7, which is fixed to a plate 8 and which is in the correct angular position corresponding to the angle $\alpha$, 90° for example, is introduced into the hollowed portion 5. A washer 9 is placed upon the rod so as to be pressed against the opposite face of the bracket, while a nut 10 enables tightening to be effected, which displaces the plate 8 and deforms the part 1 until the face 6 may be at the exact distance b from the mark 4. The said distance may be determined by any gauge, fixed or not fixed to the plate 8.

The diameter of the rod 7, which is virtually the axis of the hollow portion 5, is so chosen that the clearance between the latter hollow portion and the rod may be sufficiently small so as to remain within the limits of the manufacturing tolerance of the part, whatever may be the position of the rod in the hollow portion.

Figure 2:
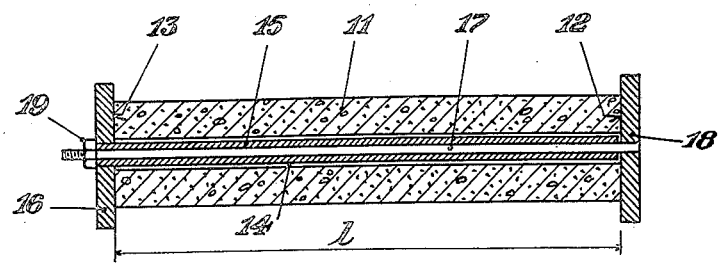
Fig. 2 shows a horizontal sectional view of another device according to the invention, applied to a hollow beam.

Fig. 2 relates to the case of a beam 11, the length $l$ of which must be strictly respected, and the two end faces 12 and 13 of which must be in a determined angular position with respect to the axis of the longitudinally hollowed portion 14, both to be perpendicular to the latter hollowed portion for example.

For this purpose a tube 15, fixed at 90° to a plate 16 by welding for example, is introduced into the hollowed portion 14 as soon as the part 11 is removed from the mould. A rod 17 welded at 90° to the plate 18 is slidingly introduced into the tube 15 through the other end. The said rod passes through the plate 16 and, upon the screw-threaded end of the rod, the nut 19 is placed, tightening of which enables the plates 16 and 18 to act upon the faces 12 and 13 until the mutual spacing thereof may exactly correspond to the distance $l$. The gauge determining the said distance may be constituted by the tube 15, so that it is sufficient fully to tighten the nut 19 in order to effect the sizing desired, the said tube then abutting against the plate 18. If the plates 16 and 18 are not perpendicular to the tube 15 and to the rod 17, the members 15 and 17 have to be provided with mutual guiding so as to prevent them from being angularly displaced while one of them is sliding into the other.

The apparatus 7 to 10 (Fig. 1) or 15 to 19 (Fig. 2) is removed as soon as the part has hardened sufficiently to prevent it from subsiding.

The pressure, instead of being produced by a tightening nut 10 or 19 pressing upon the part to be sized, may be produced by any other suitable means, for example, by an independent device which exerts a thrust upon the washer 9 or the plate 16, the plate 8 or 18 being maintained by a fixed abutment.

Moreover, instead of being put into position after the removal of the part from the mould, the device according to the invention could first be placed into the mould before filling the latter, but in this case it is advisable to make arrangements so as to prevent certain members, such as the rod 7 (Fig. 1) or the tube 15 (Fig. 2), from adhering to the concrete or the like, by greasing the said members for example.

In the examples illustrated, the plates 8, 16 and 18 are flat; nevertheless, the latter could also be of another shape and could have certain sunken portions and portions in relief, according to the final shape which the faces, upon which the said plates act, must have.

It need hardly be said that the invention is not limited to the examples described, since it will be understood that the device according to the invention will be capable of being effected in constructive shapes which are very much varied, according to the conditions which appear in each particular case and which depend especially upon the shape of the part and the nature and the relative positions of the elements having to undergo sizing.

The term "concrete" is employed here in a broad sense and covers cement, as well as any other agglomerate having a basis of stony material.

Furthermore, where it is stated that the part is removed from the mould prior to the hardening of the concrete, it is to be understood that the concrete already has a density sufficient to preserve the general shape of the part.

What I claim is:

1. A device for the manufacture of a concrete part formed in a mould, which is removed therefrom prior to the hardening of the concrete and which includes two portions whereof the relative angular position has to be effected with great precision, said device comprising a first member adapted to act upon one of said portions, a second member fixed thereto in the correct angular position to be given to the said portions and means to so guide said second member as to coincide with the position of the other of said portions, and means for exerting pressure upon the first said member.

2. A device for the manufacture of a concrete part formed in a mould, which is removed therefrom prior to the hardening of the concrete and which includes a face whereof the angular position with respect to the axis of a hollowed portion of the part has to be effected with great precision, said device comprising a rod adapted to be engaged with very little clearance in the said hollowed portion, a plate fixed to the said rod in the correct angular position and adapted to act upon the said face, and means for exerting pressure upon the said plate while bearing relatively against an opposite face of the part.

3. A device for the manufacture of a concrete part formed in a mould, which is removed therefrom prior to the hardening of the concrete and which includes a face whereof the angular position with respect to the axis of a hollowed portion of the part has to be effected with great precision, said device comprising a rod adapted to be engaged with very little clearance in the said hollowed portion, a plate fixed to the said rod in the correct angular position and adapted to act upon the said face, a washer placed on said rod for acting upon an opposite face of the part, a screw threaded portion at the free end of said rod, and a nut engaging said screw threaded portion.

4. A device for the manufacture of a concrete part formed in a mould, which is removed therefrom prior to the hardening of the concrete and which includes two opposite faces whereof the positions with respect to the axis of a hollowed portion joining these faces have to be effected with great precision, said device comprising a tube adapted to be engaged with very little clearance in the said hollowed portion, a plate fixed in the correct angular position to said tube and adapted to act upon one of said faces, a rod adapted to be slidingly engaged in the said tube, a second plate fixed in the correct angular position to said rod and intended to act upon the other of said faces, and means for displacing said plates towards each other.

5. A device according to claim 4, wherein the said tube has a length equal to the correct mutual spacing that has to be effected between the said two faces.

6. A device for the manufacture of a concrete part formed in a mould, which is removed therefrom prior to the hardening of the concrete and which includes two opposite faces whereof the positions with respect to the axis of a hollowed portion joining these faces have to be effected with great precision, said device comprising a tube adapted to be engaged with very little clearance to the said hollowed portion, a plate fixed in the correct angular position to said tube and adapted to act upon one of said faces, a rod adapted to be slidingly engaged to the said tube, a second plate fixed in the correct angular position to said rod and adapted to act upon the other of said faces, a screw threaded portion at the free end of said rod projecting beyond said tube, and a nut engaging said screw threaded portion for acting upon the plate fixed to said tube.

7. In the method of manufacturing a concrete part wherein close tolerances regarding the relative angular position and distance of distinct portions of the part have to be observed, in combination, the steps of forming the part in a mould; removing the part from the mould after it has acquired a sufficient density to substantially preserve its general shape, but prior to the hardening of the concrete; exerting a compressive stress upon at least one of said portions of the part immediately after its removal from the mould; and maintaining the said pressure until the concrete is sufficiently hard and then terminating the said pressure.

RAYMOND BERTRAND.

REFERENCES CITED

The following references are of record in the file of this patent:

UNITED STATES PATENTS

| Number | Name | Date |
| --- | --- | --- |
| 1,818,254 | Hewett | Aug. 11, 1931 |
| 2,075,633 | Anderegg | Mar. 30, 1937 |
| 2,210,553 | Miller | Aug. 6, 1940 |
| 2,234,663 | Anderegg | Mar. 11, 1941 |